(12) United States Patent
Rai (10) Patent No.: US 8,725,546 B2
(45) Date of Patent: May 13, 2014

(54) WORKFLOW SCHEDULING METHOD AND SYSTEM

(75) Inventor: Sudhendu Rai, Fairport, NY (US)

(73) Assignee: Xerox Corporation, Norwalk, CT (US)

( * ) Notice: Subject to any disclaimer, the term of this patent is extended or adjusted under 35 U.S.C. 154(b) by 1828 days.

(21) Appl. No.: 11/779,494

(22) Filed: Jul. 18, 2007

(65) Prior Publication Data

US 2009/0021775 A1    Jan. 22, 2009

(51) Int. Cl.
*G06Q 10/00* (2012.01)

(52) U.S. Cl.
USPC ........... 705/7.12; 358/1.15; 358/1.9; 718/102

(58) Field of Classification Search
None
See application file for complete search history.

(56) References Cited

U.S. PATENT DOCUMENTS

| | | | |
|---|---|---|---|
| 4,821,029 A | 4/1989 | Logan et al. | |
| 5,095,369 A | 3/1992 | Ortiz et al. | |
| 5,287,194 A | 2/1994 | Lobiondo | |
| 5,513,126 A | 4/1996 | Harkins et al. | |
| 5,559,933 A | 9/1996 | Boswell | |
| 6,223,205 B1 * | 4/2001 | Harchol-Balter et al. | 718/105 |
| 6,509,974 B1 | 1/2003 | Hansen | |
| 6,546,364 B1 | 4/2003 | Smirnov et al. | |
| 6,573,910 B1 | 6/2003 | Duke et al. | |
| 6,583,852 B2 | 6/2003 | Baum et al. | |
| 6,631,305 B2 | 10/2003 | Newmark | |
| 6,633,821 B2 | 10/2003 | Jackson et al. | |
| 6,687,018 B1 | 2/2004 | Leong et al. | |
| 6,762,851 B1 | 7/2004 | Lynch et al. | |
| 6,763,519 B1 | 7/2004 | McColl et al. | |
| 6,805,502 B2 * | 10/2004 | Rai et al. | 400/61 |
| 6,925,431 B1 | 8/2005 | Papaefstathiou | |
| 6,961,732 B2 | 11/2005 | Hellemann et al. | |
| 6,970,261 B1 | 11/2005 | Robles | |
| 6,993,400 B2 | 1/2006 | Viassolo | |
| 7,016,061 B1 | 3/2006 | Hewitt | |

(Continued)

FOREIGN PATENT DOCUMENTS

| | | |
|---|---|---|
| CA | 2503427 A1 | 10/2005 |
| EP | 1630663 A2 | 3/2006 |

(Continued)

OTHER PUBLICATIONS

Kallrath Josef, "Planning nd scheduling in the process industry," OR Spectrum, Springer-Verlag (2002), 24:219-250.*

(Continued)

*Primary Examiner* — Jonathan G Sterrett
*Assistant Examiner* — Tzu-Hsiang Lan
(74) *Attorney, Agent, or Firm* — Fox Rothschild LLP (57) ABSTRACT

A system of scheduling a plurality of jobs in a production environment may include a plurality of resources and a computer-readable storage medium comprising programming instructions for performing a method of processing a plurality of jobs. The method may include receiving a plurality of jobs and setup characteristics corresponding to each job. The method may also include grouping each job having a job size that exceeds a job size threshold into a large job subgroup and grouping each job having a job size that does not exceed the job size threshold into a small job subgroup. The large job subgroup may be classified as a high setup subgroup or a low setup subgroup based on the setup characteristics corresponding to each job in the large job subgroup. The large job subgroup may be routed to a large job autonomous cell.

22 Claims, 8 Drawing Sheets

(56) References Cited

U.S. PATENT DOCUMENTS

| | | | |
|---|---|---|---|
| 7,051,328 B2 | 5/2006 | Rai et al. |
| 7,061,636 B2 | 6/2006 | Ryan et al. |
| 7,065,567 B1 | 6/2006 | Squires et al. |
| 7,079,266 B1 | 7/2006 | Rai et al. |
| 7,092,922 B2 | 8/2006 | Meng et al. |
| 7,092,963 B2 | 8/2006 | Ryan et al. |
| 7,099,037 B2* | 8/2006 | Clark et al. | 358/1.18 |
| 7,125,179 B1 | 10/2006 | Rai et al. |
| 7,148,985 B2 | 12/2006 | Christodoulou et al. |
| 7,152,589 B2 | 12/2006 | Ekeroth et al. |
| 7,161,699 B2 | 1/2007 | Matoba |
| 7,161,705 B2 | 1/2007 | Klassen |
| 7,174,232 B2* | 2/2007 | Chua et al. | 700/102 |
| 7,200,505 B2 | 4/2007 | Shan |
| 7,206,087 B2 | 4/2007 | Ryan et al. |
| 7,382,484 B2 | 6/2008 | Matsukubo et al. |
| 7,408,658 B2 | 8/2008 | Twede |
| 7,523,048 B1 | 4/2009 | Dvorak |
| 7,548,335 B2 | 6/2009 | Lawrence et al. |
| 7,562,062 B2 | 7/2009 | Ladde et al. |
| 7,567,360 B2 | 7/2009 | Takahashi et al. |
| 7,576,874 B2 | 8/2009 | Farrell et al. |
| 7,584,116 B2 | 9/2009 | Kakouros et al. |
| 7,590,937 B2 | 9/2009 | Jacobus et al. |
| 7,684,066 B2 | 3/2010 | Shirai |
| 7,689,694 B2 | 3/2010 | Kato et al. |
| 7,761,336 B1 | 7/2010 | Blankenship et al. |
| 7,872,769 B2 | 1/2011 | Akashi et al. |
| 7,949,740 B2 | 5/2011 | Scrafford et al. |
| 8,004,702 B2 | 8/2011 | Noda |
| 8,384,927 B2 | 2/2013 | Harmon et al. |
| 2001/0055123 A1 | 12/2001 | Ryan et al. |
| 2002/0016803 A1 | 2/2002 | Ryan et al. |
| 2002/0054344 A1 | 5/2002 | Tateyama |
| 2002/0057455 A1 | 5/2002 | Gotoh et al. |
| 2002/0071134 A1 | 6/2002 | Jackson et al. |
| 2002/0129081 A1 | 9/2002 | Rai |
| 2002/0174093 A1 | 11/2002 | Casati et al. |
| 2002/0198794 A1 | 12/2002 | Williams et al. |
| 2003/0079160 A1 | 4/2003 | McGee et al. |
| 2003/0098991 A1 | 5/2003 | Laverty et al. |
| 2003/0105661 A1 | 6/2003 | Matsuzaki et al. |
| 2003/0121431 A1 | 7/2003 | Ohno |
| 2003/0149747 A1 | 8/2003 | Rai et al. |
| 2003/0200252 A1* | 10/2003 | Krum | 709/102 |
| 2003/0202204 A1 | 10/2003 | Terrill et al. |
| 2004/0130745 A1* | 7/2004 | Fabel et al. | 358/1.15 |
| 2004/0135838 A1 | 7/2004 | Owen et al. |
| 2004/0136025 A1 | 7/2004 | Moriyama et al. |
| 2004/0239992 A1 | 12/2004 | Kawai et al. |
| 2004/0267485 A1* | 12/2004 | Penov et al. | 702/119 |
| 2004/0268349 A1 | 12/2004 | Ramakrishnan et al. |
| 2005/0060650 A1 | 3/2005 | Ryan et al. |
| 2005/0065830 A1 | 3/2005 | Duke et al. |
| 2005/0068562 A1 | 3/2005 | Ferlitsch |
| 2005/0114829 A1 | 5/2005 | Robin et al. |
| 2005/0134886 A1 | 6/2005 | Farrell et al. |
| 2005/0151993 A1 | 7/2005 | Gartstein et al. |
| 2005/0154625 A1* | 7/2005 | Chua et al. | 705/7 |
| 2005/0275875 A1 | 12/2005 | Jennings, Jr. |
| 2006/0031585 A1 | 2/2006 | Nielsen et al. |
| 2006/0132512 A1 | 6/2006 | Walmsley et al. |
| 2006/0149755 A1* | 7/2006 | Marshall et al. | 707/100 |
| 2006/0224440 A1 | 10/2006 | Rai |
| 2006/0226980 A1 | 10/2006 | Rai et al. |
| 2007/0008580 A1 | 1/2007 | Tanaka |
| 2007/0019228 A1 | 1/2007 | Rai et al. |
| 2007/0070379 A1 | 3/2007 | Rai et al. |
| 2007/0078585 A1 | 4/2007 | Pomeroy et al. |
| 2007/0091355 A1 | 4/2007 | Rai |
| 2007/0092323 A1 | 4/2007 | Lin et al. |
| 2007/0124182 A1 | 5/2007 | Rai |
| 2007/0177191 A1 | 8/2007 | Eschbach et al. |
| 2007/0236724 A1 | 10/2007 | Rai et al. |
| 2007/0247657 A1 | 10/2007 | Zhang et al. |
| 2007/0247659 A1 | 10/2007 | Zhang et al. |
| 2007/0279675 A1 | 12/2007 | Quach et al. |
| 2007/0293981 A1 | 12/2007 | Rai |
| 2008/0013109 A1 | 1/2008 | Chen et al. |
| 2008/0201182 A1 | 8/2008 | Schneider et al. |
| 2008/0239368 A1 | 10/2008 | Ota |
| 2008/0256541 A1 | 10/2008 | Rai |
| 2009/0094094 A1 | 4/2009 | Rai et al. |
| 2009/0313061 A1 | 12/2009 | Rai et al. |
| 2009/0313063 A1 | 12/2009 | Rai |
| 2009/0327033 A1 | 12/2009 | Rai et al. |

FOREIGN PATENT DOCUMENTS

| | | |
|---|---|---|
| EP | 1705556 A1 | 9/2006 |
| JP | 11282909 A | 10/1999 |
| JP | 2003058340 A | 2/2003 |
| JP | 2005011066 A | 1/2005 |
| JP | 2005250823 A | 9/2005 |

OTHER PUBLICATIONS

Burkard Rainer E., et al., "A process scheduling problem arising from chemical production planning," Optimization methods and software, vol. 10 issue 2, 1998 pp. 175-196.*

Mestha, Lalit K., et al. "Control elements in production printing and publishing systems: DocuColor iGen3." Decision and Control, 2003. Proceedings. 42nd IEEE Conference on. vol. 4. IEEE, 2003.*

Potts, Chris N., and Mikhail Y. Kovalyov. "Scheduling with batching: a review." European Journal of Operational Research 120.2 (2000): 228-249.*

Crovella, Mark E., Mor Harchol-Balter, and Cristina D. Murta. "Task assignment in a distributed system (extended abstract): improving performance by unbalancing load." ACM SIGMETRICS Performance Evaluation Review. vol. 26. No. 1. ACM, 1998.*

Schroeder, Bianca, and Mor Harchol-Balter. "Evaluation of task assignment policies for supercomputing servers: The case for load unbalancing and fairness." Cluster Computing 7.2 (2004): 151-161.*

Harchol-Balter, "On Choosing a Task Assignment Polley for a Distributed Server System", IEEE Journal of Parallel and Distributed Computing, 1999, pp. 204-228.

Dueck, et al., "Threshold Accepting: A General Purpose Optimization Algorithm Appearing Superior to Simulated Annealing", Journal of Computational Physics vol. 90, Issue 1, Sep. 1990, pp. 161-175, Academic Press, Inc.

Rai, et al., "A Lean Document Production Controller for Printshop Management", Proceedings of the 42nd IEEE Conference on Decision and Control, Maui, Hawaii, Dec. 2003.

Zheng et al., "Finding Optimal (s,S) Policies Is About as Simple as Evaluating a Single Policy", Operations Research, vol. 39, No. 4, (Jul.-Aug. 1991), pp. 654-665.

Bo Hu, "An Application of Inventory Models in Printing Industry", Ph.D. Candidate in Operations Management, The Simon School of Business, University of Rochester, Jul. 2007.

Veinott, Jr., et al., "Computing Optimal (s,S) Inventory Policies", Management Science, vol. 11, No. 5, Series A., Sciences, Mar. 1965, pp. 525-552.

Simchi Levi, et al. "Designing & Managing The Supply Chain: Concepts, Strategies, and Cases", Second Edition, 2000, McGraw-Hill Higher Education, New York, New York.

Cleveland et al., "STL: A Seasonal-Trend Decomposition Procedure Based on Loess", Journal of Official Statistics, vol. 16, No. 1, 1990, pp. 3-33, Sweden.

Veinott, Jr., "Optimal Policy in a Dynamic, Single Product, Nonstationary Inventory Model with Several Demand Classes", Mar. 16, 1965, Operations Research, vol. 13, No. 5, Sep.-Oct. 1965, pp. 761-778.

Faraway, "Extending the Linear Model with R: Generalized Linear, Mixed Effects and Nonparametric Regression Models" 2006, Chapman & Hall/CRC, Boca Raton, Florida.

Creo, "UpFront White Paper", www.creo.com, May 2003, 14 pages.

Mason, Dennis E., "Workflow: Defining Print's Future", www.printandgraphicsmag.com/edit_pages/0803/lead.html, Apr. 7, 2005, 3 pages.

(56) References Cited

OTHER PUBLICATIONS

Lesh, et al., "Improving Big Plans", Computer Science Department, University of Rochester, 8 pages.

Wellman, Michael P., "Fundamental Concepts of Qualitative Probabilistic Networks", WRDC/TXI, 58 pages, Wright-Patterson AFB, OH.

Mohammed, et al., "Planmine: Sequence Mining for Plan Failures", Computer Science Department, University of Rochester, Rochester, NY, 5 pages.

Wil Van Der Aist et al., "Workflow Mining: Discovering Process Models from Event Logs", IEEE Transactions on Knowledge and Data Engineering, vol. 16, No. 9, Sep. 2004, 14 pages.

Mohammed, J. Zaki, et al., "PlanMine: Predicting Plan Failures Using Sequence Mining", The University of Rochester Computer Science Department Technical Report 671, Jul. 1998, 22 pages.

Nebel, et al., "Plan Reuse versus Plan Generation: A Theoretical and Empirical Analysis", to appear in Artificial Intelligence (Special Issue on Planning and Scheduling), Mar. 9, 1995, 21 pages.

Marco, Dorigo, et al., "The Ant System: Optimization by a Colony of cooperating agents" IEEE Transacations of Systems, Man and Cybernetics—Part B, vol. 26, No. 1, 1996, pp. 1-26.

Doerner, Karl, et al., "Ant Colony Optimization in Multiobjective Portfolio Selection", $4^{th}$ Metaheuristics International Conference, Porto, Portugal, Jul. 16-20, 2001, pp. 243-248.

* cited by examiner

| JOB | TRIM TYPE | EXTERIOR COLOR TYPE |
|---|---|---|
| J1 | A | 1 |
| J2 | B | 1 |
| J3 | A | 3 |
| J4 | C | 2 |
| J5 | B | 2 |
| J6 | A | 1 |
| J7 | A | 3 |
| J8 | C | 2 |
| J9 | B | 2 |
| J10 | C | 1 |

FIG. 3

| JOB | TRIM TYPE | EXTERIOR TYPE |
|---|---|---|
| J1 | A | 1 |
| J2 | A | 2 |
| J3 | B | 1 |
| J4 | A | 2 |
| J5 | A | 1 |

FIG. 4

| JOB | FORM TYPE | INSERT TYPE |
|---|---|---|
| J1 | A | 1 |
| J2 | B | 2 |
| J3 | C | 2 |
| J4 | D | 2 |
| J5 | B | 1 |

| JOB | TRIM TYPE (605) | EXTERIOR TYPE (610) |
|---|---|---|
| J1 | A | 1 |
| J2 | B | 3 |
| J3 | B | 2 |
| J4 | A | 1 |
| J5 | B | 3 |

| JOB | JOB SIZE | TRIM TYPE | EXTERIOR COLOR TYPE |
|-----|----------|-----------|---------------------|
| J2  | 2,350    | B         | 1                   |
| J4  | 1,910    | C         | 2                   |
| J5  | 1,300    | A         | 1                   |

FIG. 7B

| JOB | JOB SIZE | TRIM TYPE | EXTERIOR COLOR TYPE |
|-----|----------|-----------|---------------------|
| J1  | 1,000    | A         | 2                   |
| J3  | 800      | A         | 3                   |

FIG. 7C

| JOB | WORK-IN-PROGRESS LEVEL | POSITION IN SEQUENCE |
|---|---|---|
| A1 | 750 | 2 |
| A2 | 1,500 | 3 |
| A3 | 4,300 | 1 |
| A4 | 500 | 5 |
| A5 | 920 | 4 |

WORKFLOW SCHEDULING METHOD AND SYSTEM

CROSS REFERENCE TO RELATED APPLICATIONS

This application is related to U.S. patent application Ser. Nos. 11/779,464; 11/779,512; 11/779,392; 11/779,418; 11/779,437; 11/779,454; and 10/946,756 filed Sep. 22, 2004.

BACKGROUND

The disclosed embodiments relate generally to a method and system for scheduling jobs in a manufacturing or production environment.

Manufacturing and production processes produce results by receiving sets of instructions and materials required to create or modify an item, such as a document, a vehicle, a computing device or another item. Often, the processes must permit some customization or alteration of individual items based on customer desires. For example, although an automobile production line may be configured to produce a particular make and model of car, the individual cars produced may have different specifications, such as leather or cloth seating, standard or premium wheels, exterior paint color and other specifications of type. As another example, document production environments, such as print shops, convert printing orders, such as print jobs, into finished printed material. A print shop may process print jobs using resources such as printers, cutters, collators and other similar equipment. Typically, resources in print shops are organized such that when a print job arrives from a customer at a particular print shop, the print job can be processed by performing one or more production functions.

Scheduling architectures that organize jobs arriving in a production process and route the jobs to autonomous cells are known in the art and are described in, for example, U.S. Pat. No. 7,051,328 to Rai et al. and U.S. Pat. No. 7,065,567 to Squires et al., the disclosures of which are incorporated by reference in their entirety.

Production environments can receive high volume jobs. In addition, there can be significant variability associated with the jobs due to multiple types of setup characteristics associated with each job. As such, the known scheduling architecture may be inefficient in processing high volume, highly variable jobs.

Variation in these production requirements from job to job can cause significant processing delays even when resources have been allocated to balance the job flow. For example, jobs can have a number of different setup characteristics, and each setup characteristic may correspond to several different characteristic types. Significant setup delays can arise in processing jobs with variable setup characteristics in a production environment. Setup time can be particularly acute in production environments where substantial interruption in operation is unacceptable, such as environments that utilize continuous feed or processing equipment. Setup delays can significantly impact throughput.

SUMMARY

Before the present methods are described, it is to be understood that this invention is not limited to the particular systems, methodologies or protocols described, as these may vary. It is also to be understood that the terminology used herein is for the purpose of describing particular embodiments only, and is not intended to limit the scope of the present disclosure which will be limited only by the appended claims.

It must be noted that as used herein and in the appended claims, the singular forms "a," "an," and "the" include plural reference unless the context clearly dictates otherwise. Thus, for example, reference to a "job" is a reference to one or more jobs and equivalents thereof known to those skilled in the art, and so forth. Unless defined otherwise, all technical and scientific terms used herein have the same meanings as commonly understood by one of ordinary skill in the art. As used herein, the term "comprising" means "including, but not limited to."

In an embodiment, a system of scheduling a plurality of jobs in a production environment may include a plurality of resources and a computer-readable storage medium comprising one or more programming instructions for performing a method of processing a plurality of jobs in a production environment. The method may include receiving a plurality of jobs and at least one setup characteristic corresponding to each job. Each job may have a corresponding job size. The method may also include determining, for each job, whether the corresponding job size exceeds a job size threshold, grouping each job having a job size that exceeds the job size threshold into a large job subgroup, grouping each job having a job size that does not exceed the job size threshold into a small job subgroup and routing the small job subgroup to a small job autonomous cell that includes one or more resources for processing the small job subgroup. The large job subgroup may be classified as a high setup subgroup or a low setup subgroup based on the setup characteristics corresponding to each job in the large job subgroup. The large job subgroup may be routed to a large job autonomous cell. If the large job subgroup is a high setup subgroup, the large job autonomous cell may include one or more first resources for processing the large job subgroup. If the large job subgroup is a low setup subgroup, the large job autonomous cell may include one or more second resources for processing the large job subgroup.

In an embodiment, a computer-implemented method of scheduling a plurality of jobs in a document production environment may include receiving a plurality of jobs and at least one setup characteristic corresponding to each job. Each job may have a corresponding job size. The method may also include determining, for each job, whether the corresponding job size exceeds a job size threshold, grouping each job having a job size that exceeds the job size threshold into a large job subgroup, grouping each job having a job size that does not exceed the job size threshold into a small job subgroup and routing the small job subgroup to a small job autonomous cell that includes one or more resources for processing the small job subgroup. The large job subgroup may be classified as a high setup subgroup or a low setup subgroup based on the setup characteristics corresponding to each job in the large job subgroup. The large job subgroup may be routed to a large job autonomous cell. If the large job subgroup is a high setup subgroup, the large job autonomous cell may include one or more first resources for processing the large job subgroup. If the large job subgroup is a low setup subgroup, the large job autonomous cell may include one or more second resources for processing the large job subgroup.

DETAILED DESCRIPTION

For purposes of the discussion below, a "production environment" or "production process" refers to an entity having multiple items of equipment to manufacture and/or process items that may be customized based on customer requirements. For example a vehicle production environment may exist in an automobile assembly plant, where different areas exist to assemble and/or finish portions of the automobile such as the engine, trim, drive train and other parts. A document production environment includes document production resources, such as printers, cutters, collators and the like. A chemical, pharmaceutical or other process industry production environment may include production resources such as chemical processing units, vessels, heating equipment, mixing equipment and the like. A production environment may be a freestanding entity, including one or more production-related devices, or it may be part of a corporation or other entity. Additionally, the production environment may communicate with one or more servers by way of a local area network or a wide area network, such as the Internet or the World Wide Web.

A "job" refers to a logical unit of work that is to be completed for a customer. A job may include one or more jobs to build, assemble or process a product. A production system may include a plurality of jobs.

Figure 1:
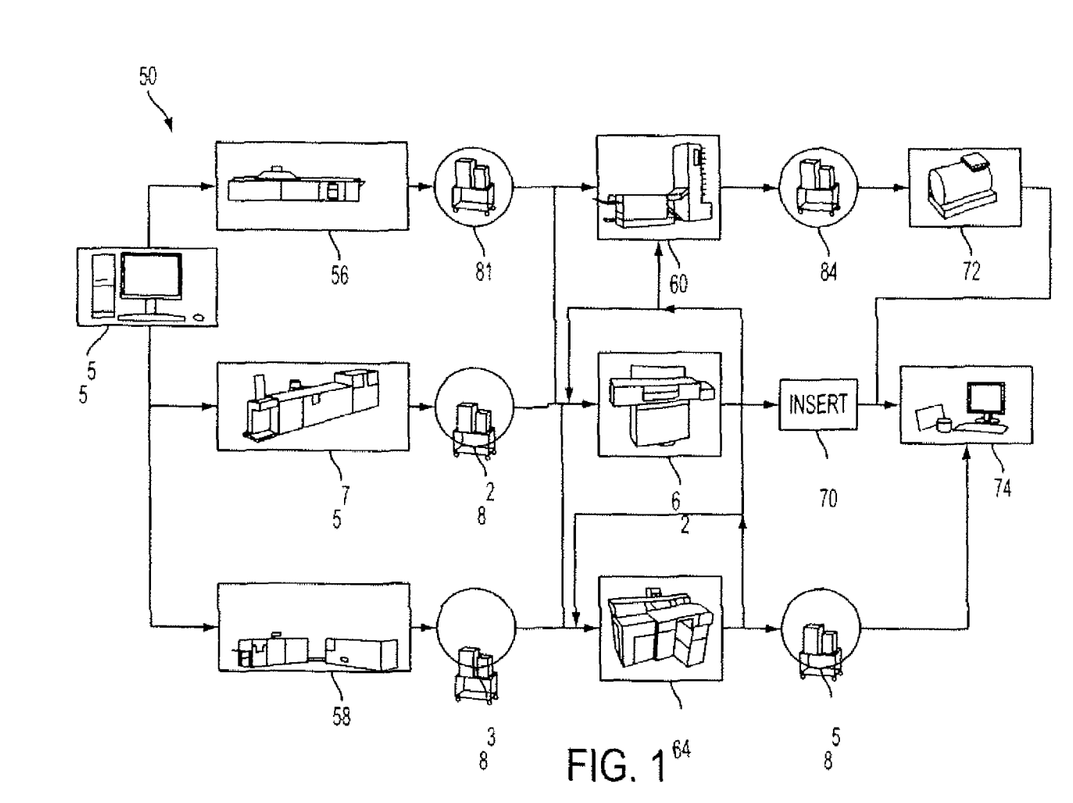
FIG. 1 illustrates an exemplary print shop production environment according to an embodiment.

FIG. 1 shows an example of a production environment 50, in this case, exemplary elements of a print shop. Print jobs may enter the print shop manually or electronically and be collected at an electronic submission system 55 such as a computing device and/or scanner. Jobs are sorted and batched at the submission system or another location before being delivered to one or more print engines such as a color printer 56, black-and-white printer 57 and/or a continuous feed printer 58. Jobs may exit the print engine and be delivered to one or more finishing devices or areas such as a collator 60, cutter 62, and/or binder 64. The finishing areas may include automatic or manual areas for such finishing activities and they also may include an automatic or manual inserter 70. Finally, jobs may move to a postage metering station 72 and/or shipping station 74. Jobs may move from one location to another in the print shop by automatic delivery or manual delivery such as by hand or by one or more paper carts 81-85.

Jobs may have different processing requirements. For example, incoming jobs may have variable job sizes, setup requirements, processing frequency and the like. An autonomous cell refers to a group of resources used to process jobs. An autonomous cell may include the resources needed to complete at least one job. For example, in a document production environment, if the job requires printing, cutting and collating, an autonomous cell for processing the job may include at least one printer, one cutter and one collator. In a chemical production environment, an autonomous cell may include production resources necessary to convert a plurality of raw material inputs into one or more complete chemical outputs.

Figure 2A:
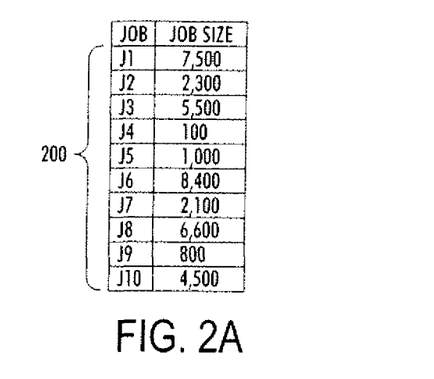
FIG. 2A depicts an exemplary plurality of jobs according to an embodiment.

In an embodiment, jobs may be partitioned into subgroups based on job size. FIG. 2A illustrates a plurality of jobs, J1-J10 200, and corresponding job sizes. In an embodiment, the size of each job may be determined and compared to a threshold size. The threshold size may represent a value necessary to optimize process flow. If the size of a job equals or exceeds the threshold size, the job may be classified as a large job. If the size of a job is less than the threshold volume, the job may be classified as a small job.

Figure 2B:
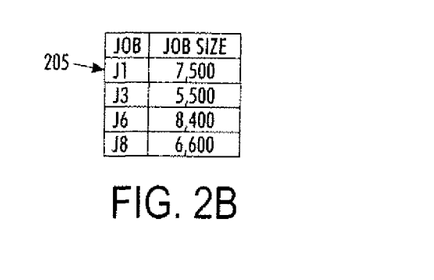
FIG. 2B depicts an exemplary large job subgroup according to an embodiment.
Figure 2C:
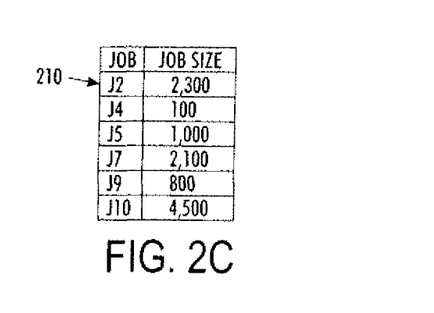
FIG. 2C depicts an exemplary small job subgroup according to an embodiment.

As illustrated in FIG. 2B, job J1 205 is grouped in a large job subgroup because its size (i.e., 7,500) exceeds the threshold size (i.e., 5,000). Similarly, as illustrated in FIG. 2C, job J2 210 is grouped in a small job subgroup because its size (i.e., 2,300) is less than the threshold size (i.e., 5,000).

In an embodiment, a subgroup may be categorized based on setup characteristics. A setup characteristic may include a feature of any step in the production process. For example, in a document production system, the printer setup may be dependent on the type of form used. Alternatively, the insertion operation setup may depend on one or more inserts associated with each job. As yet another example, in a chemical production environment, setup characteristics may be associated with cleaning and preparing production resources to process a next chemical product type. For example, a setup characteristic may include a time required to clean one production resource before it may be used to process another chemical product.

In an embodiment, each setup characteristic may be associated with one or more types. For example, a form type setup characteristic may be associated with three types of forms: form A, form B and form C. In an automobile production environment, setup characteristics may result from customer selections of trim design, exterior paint color, interior color, seating type, transmission type, engine size, audio equipment, security systems, remote start systems, other electronics options and/or other features. In a computer system production environment, setup characteristics may result from customer selections of hard drive capacity, random access memory capacity, processing speed, video or graphics cards, storage drives, operating systems, sound cards, installed software and/or other features.

Figure 3:
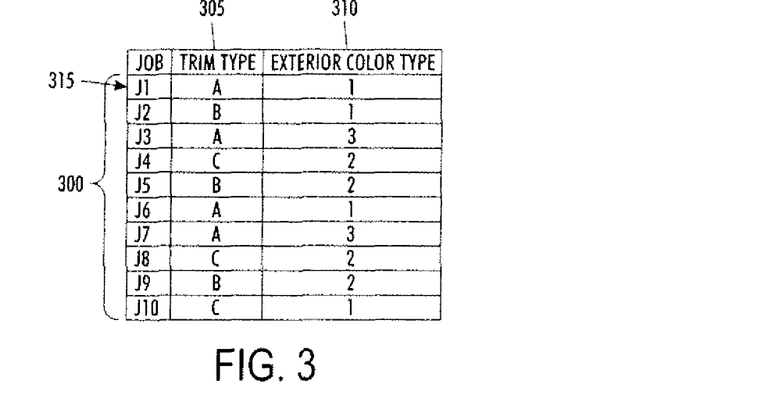
FIG. 3 depicts an exemplary plurality of jobs and corresponding form types and insert types according to an embodiment.

Subgroups may be categorized based on the number of types associated with each setup characteristic. For example, in a vehicle production environment, a subgroup may be associated with two setup characteristics, such as trim type and exterior color. As illustrated by FIG. 3, ten jobs, jobs J1-J10 300 may be associated with a trim type characteristic 305 and an exterior color characteristic 310. For example, job J1 315 may be associated with trim type A and exterior color type 1.

In an alternate embodiment, subgroups may be categorized based on the average number of types associated with each setup characteristic over a specified interval. In addition, the average number of setup characteristics may be evaluated over multiple intervals. For example, a subgroup may utilize one trim type on day 1, three trim types on day 2 and two trim types on day 3, thus producing an average of two trim types per day.

In an embodiment, a threshold value may be determined for each setup characteristic. The threshold value may represent the number of types associated with each setup characteristic that may be necessary to optimize job flow. The threshold value may be determined using a simulation model, such as a model based on discrete event simulation, to simulate and optimize the workflow. A simulation-based approach may be used to determine an optimal number of types for each setup characteristic by using manual iteration until an improved solution is obtained. Alternatively, formal optimization techniques may be used. If formal optimization techniques are used, the threshold parameters may be specified as variables and a performance measure, such as the total number of late jobs, total production cost or the like, of the overall print shop may be used as an objective function to be optimized. Constraint functions may also be specified in addition to constraints on variables. Threshold parameters may then be determined via an optimization of the simulation model. Several techniques, such as mixed-integer programming, simulated annealing, genetic programs and the like can be used to perform the optimization that may include discrete and continuous decision variables.

In an embodiment, a subgroup may be categorized based on a comparison between the number of types associated with each setup characteristic and the threshold value for each setup characteristic. For example, if the threshold value associated with trim type is '2' and the threshold value associated with exterior color type is '3', a subgroup having two or fewer trim types and three or fewer exterior color types may be identified as a low setup subgroup. A low setup subgroup may include jobs that have low setup requirements when compared to the thresholds associated with the setup requirements. For example, a low setup subgroup may include jobs with similar setup requirements which may ease transitioning from one job to the next.

A subgroup having more than two trim types and/or more than three exterior color types may be identified as a high setup subgroup or the like. A high setup subgroup may include jobs that have high setup requirements when compared to the thresholds associated with the setup requirements. For example, a high setup subgroup may include several small to mid-sized jobs with substantially different setup requirements which may cause significant delays in transitioning from one job to the next.

Figure 4:
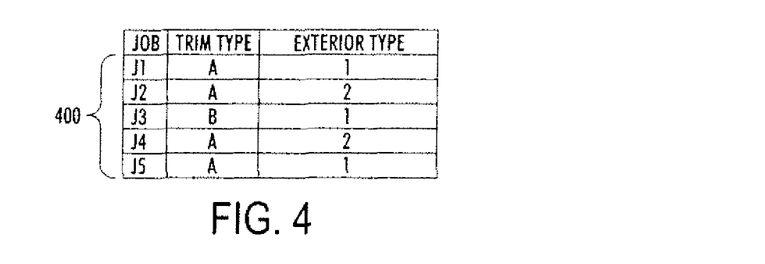
FIG. 4 depicts an exemplary fast job subgroup according to an embodiment.

FIG. 4 illustrates categorizing a subgroup 400, J1-J5, in this manner. As illustrated in FIG. 4, subgroup 400 utilizes two trim types (i.e., trim type A and trim type B) and two exterior color types (i.e., exterior color type 1 and exterior color type 2). If the trim type threshold value is 2 and the exterior color type threshold value is 3, then the subgroup 400 may be identified as a low setup subgroup because the number of trim types associated with the subgroup equals the trim type threshold value and because the number of exterior color types associated with the subgroup is less than the exterior color type threshold value.

Figure 5:
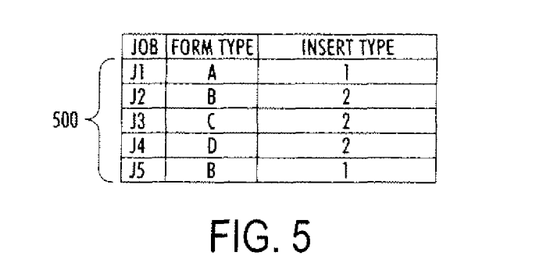
FIG. 5 depicts an exemplary plurality of jobs according to an embodiment.

In comparison, as illustrated by FIG. 5, the subgroup 500, J1-J5 utilizes four trim types (i.e., trim type A, trim type B, trim type C and trim type D) and two exterior color types (i.e., exterior color type 1 and exterior color type 2). Even though the number of exterior color types associated with the subgroup 500 (i.e., 2) is less than the threshold value associated with the exterior color type setup characteristic (i.e., 3), the subgroup 500 may be identified as a high setup subgroup because the number of trim types associated with the subgroup 500 (i.e., 4) exceeds the threshold value associated with the trim type setup characteristic (i.e., 2).

In an alternate embodiment, a subgroup may be grouped based on different threshold conditions. For example, a subgroup may be identified as a low setup subgroup if the number of types associated with one setup characteristic is less than the threshold value associated with that setup characteristic. For example, a subgroup may be identified as a low setup subgroup if the number of form types associated with the subgroup is less than or equal to the threshold value associated with the form type characteristic. Referring to FIG. 5, if the form type threshold value is 5, then the subgroup 500 may be identified as a low setup subgroup because the subgroup 500 utilizes four trim types which is less than the threshold value associated with the trim type characteristic.

Figure 6:
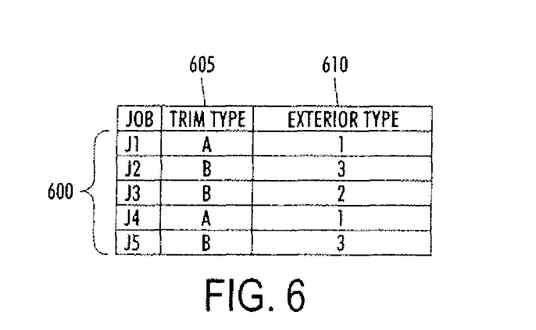
FIG. 6 depicts an exemplary plurality of jobs according to an embodiment.

In another embodiment, a subgroup may be identified according to a plurality of thresholds associated with the same setup characteristic. For example, a subgroup having a number of types less than a first threshold value, but more than a second threshold value may be grouped in an intermediate setup subgroup. FIG. 6 illustrates a subgroup 600, J1-J5, having a trim type setup characteristic 605 and an exterior color type setup characteristic 610. The first threshold value associated with the trim type setup characteristic may be '3', and the second threshold value associated with the trim type setup characteristic may be '1'. Similarly, the first setup characteristic associated with the exterior color type setup characteristic may be '4', and the second threshold value associated with the exterior color type setup characteristic may be '2'. The subgroup 600 utilizes two trim types (i.e., trim type A and trim type B) which is between the first threshold value (i.e., 3) and the second threshold value (i.e., 1) associated with the trim type characteristic. The subgroup also utilizes three exterior color types (i.e., exterior color type 1, exterior color type 2 and exterior color type 3) which is between the first threshold value (i.e., 4) and the second threshold value (i.e., 2) associated with the exterior color type characteristic.

Figure 7A:
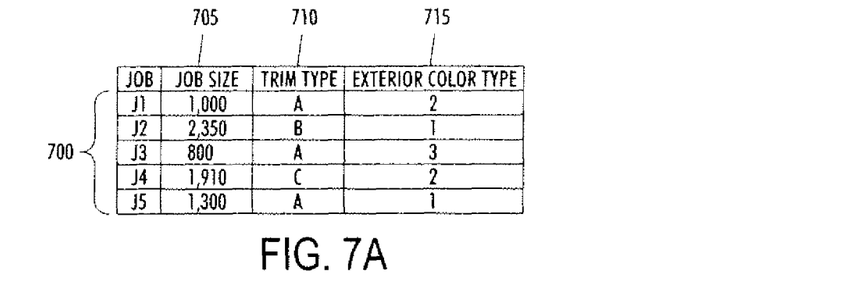
FIG. 7A depicts an exemplary plurality of jobs and corresponding job sizes, form types and insert types according to an embodiment.

In an embodiment, a subgroup may be categorized based on multiple job attributes. For example, jobs may first be grouped into a large job subgroup or a small job subgroup based on job sizes. FIG. 7A illustrates jobs, J1-J5 700, and corresponding job sizes 705, trim types 710 and exterior color types 715.

Figure 7B:
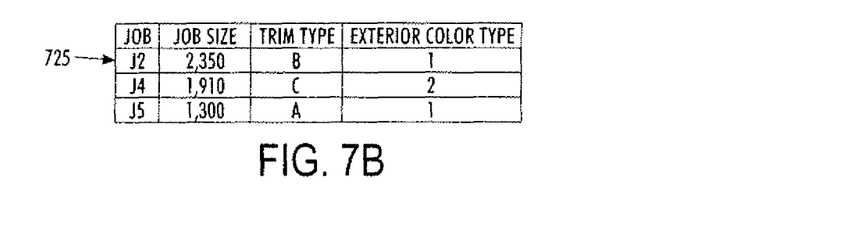
FIG. 7B depicts an exemplary large job subgroup according to an embodiment.
Figure 7C:
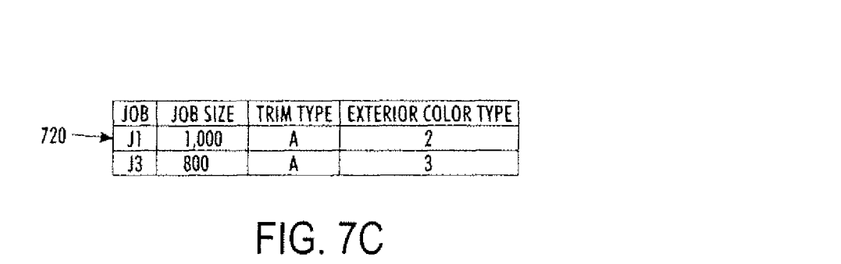
FIG. 7C depicts an exemplary small job subgroup according to an embodiment.

If the threshold job size value is 1100, for example, the jobs 700 may be grouped into a large job subgroup, illustrated by FIG. 7B, and a small job subgroup, illustrated by FIG. 7C. For example, the size of job J1 720 (i.e., 1,000) is less than the threshold job size value, so job J1 may be grouped in a small job subgroup. Likewise, the size of job J2 725 (i.e., 2,350) exceeds the threshold job size value, so job J2 may be grouped in a large job subgroup.

The large job subgroup illustrated in FIG. 7B may be categorized as a low setup subgroup or a high setup subgroup based on the setup characteristics associated with the subgroup. For example, if the trim type threshold value is 2 and the exterior color type threshold value is 2, then the large job subgroup may be identified as a high setup subgroup because the number of trim types associated with the large job subgroup (i.e., 3) exceeds the form type threshold value.

Although this embodiment illustrates categorizing jobs first based on job size, then based on setup characteristics, additional and/or alternate methodologies may be used within the scope of this disclosure.

In an embodiment, jobs in a subgroup may be arranged prior to being processed. For example, jobs may be sequenced according to a first-in-first-out ("FIFO") policy, an earliest due date ("EDD") policy or the like.

A FIFO policy may arrange jobs based on the order in which they were received. For example, a subgroup may contain three jobs, J1-J3. If J2 is received first, J1 is received second and J3 is received third, the subgroup may be processed in the following order: J2, J1, J3.

An EDD policy may arrange jobs based on the order in which they are due. For example, a subgroup may contain three jobs, J1-J3. If J3 is due first, J1 is due second and J2 is due last, then the subgroup may be processed in the following order: J3, J1, J2.

In an embodiment, a subgroup may be routed to one or more autonomous cells using a least work-in-progress policy, a round robin policy, a random policy, a size interval task assignment with equal load ("SITA-E") policy or the like.

Figure 8:
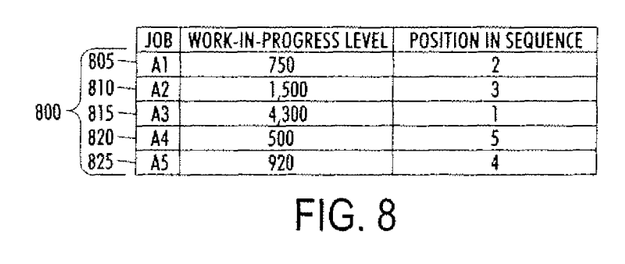
FIG. 8 depicts an exemplary plurality of autonomous cells and corresponding utilization percentages and positions in a sequence according to an embodiment.

A least work-in-progress policy may determine a volume of work within each autonomous cell and may route job sets to the autonomous cell with the smallest work volume. For example, as illustrated by FIG. 8, autonomous cell A4 820 has the lowest volume of all autonomous cells, A1-A5 800, so using a least work-in-progress policy, a job may be routed to autonomous cell A4 820.

A round robin policy may route a subgroup to an autonomous cell in a particular order. For example, autonomous cells may receive subgroups sequentially or in a specified order. The round robin policy may route a subgroup to the autonomous cell which is next in the order. As illustrated by FIG. 8, autonomous cells A1-A5 800 may receive subgroups in a specified sequence based on each cell's position in the sequence, namely: A3 815, A1 805, A2 810, A5 825, A4 820. As such, if autonomous cell A2 810 received the last subgroup, autonomous cell A5 825 may receive the next subgroup using a round robin policy.

A random policy may randomly route jobs to an autonomous cell. For example, referring to FIG. 8, any one of the autonomous cells A1-A5 800 may have an equal probability of receiving a job.

A SITA-E policy may route subgroups to an autonomous cell tasked with processing job sets of similar sizes. For example, each autonomous cell may be assigned a separate range of job sizes so that the total load each autonomous cell receives is roughly the same. In an embodiment, a job size distribution that appears to have heavy-tail characteristics may be modeled using a bounded Pareto distribution such that:

$$f(x) = \frac{\alpha k^\alpha x^{(-\alpha-1)}}{(1-(k/p)^\alpha)} \quad k \leq x \leq p$$

Variable k may represent the smallest job size in the distribution, variable p may represent the largest job size in the distribution and α may represent the index of stability that may be determined through fitting the distribution. The job size distribution may then be divided into multiple segments where each segment may be represented as:

$$\int_{x_h=k}^{x_1} x\,dF(x) = \int_{x_1}^{x_2} x\,dF(x) = \ldots = \int_{x_{h-1}}^{x_h=p} x\,dF(x) = \frac{M}{h} = \frac{\int_k^p x\,dF(x)}{h}$$

$$x_1 = \left(\frac{(h-i)}{h}k^{1-\alpha} + \frac{i}{h}p^{1-\alpha}\right)^{\frac{1}{1-\alpha}} \text{ if } \alpha \neq 1$$

$$x_1 = k\left(\frac{p}{k}\right)^{\frac{1}{h}} \text{ if } \alpha = 1$$

$$F(x) = Pr\{X \leq x\}$$

Figure 9:
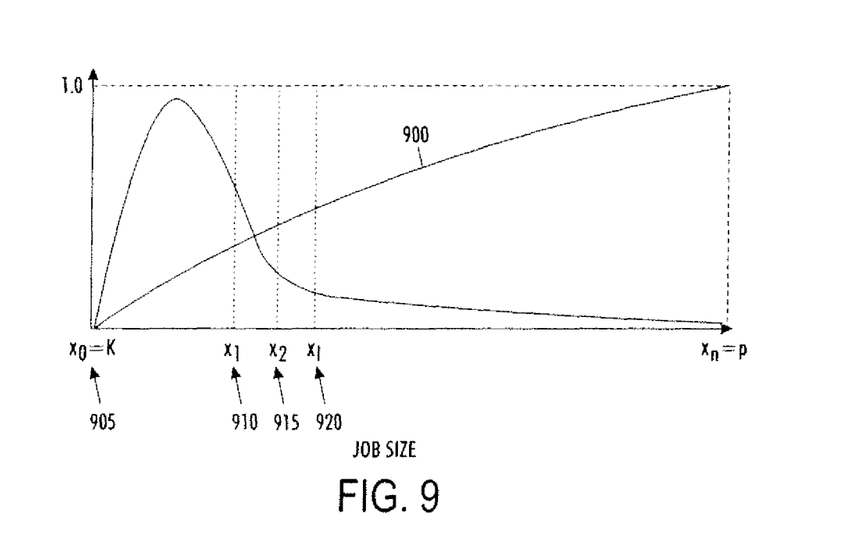
FIG. 9 depicts an exemplary graph of a job size distribution and size intervals using the SITA-E routing policy according to an embodiment.

FIG. 9 illustrates an exemplary job size cumulative density function curve and corresponding segments according to an embodiment. For example, the area under the cumulative density curve 900 between $x_0=k$ 905 and $x_1$ 910 may be substantially the same as the area under the cumulative density curve 900 between $x_1$ 910 and $x_2$ 915, between $x_2$ 915 and $x_i$ 920, and so on, where $x_1, x_2, x_i, \ldots, x_h$ represent job sizes between the smallest job size in the distribution (i.e., k) and the largest job size in the distribution (i.e., p). As such, the range of job sizes associated with jobs in a subgroup may be determined and the jobs may be routed to an autonomous cell which processes jobs of the determined size range.

Figure 10:
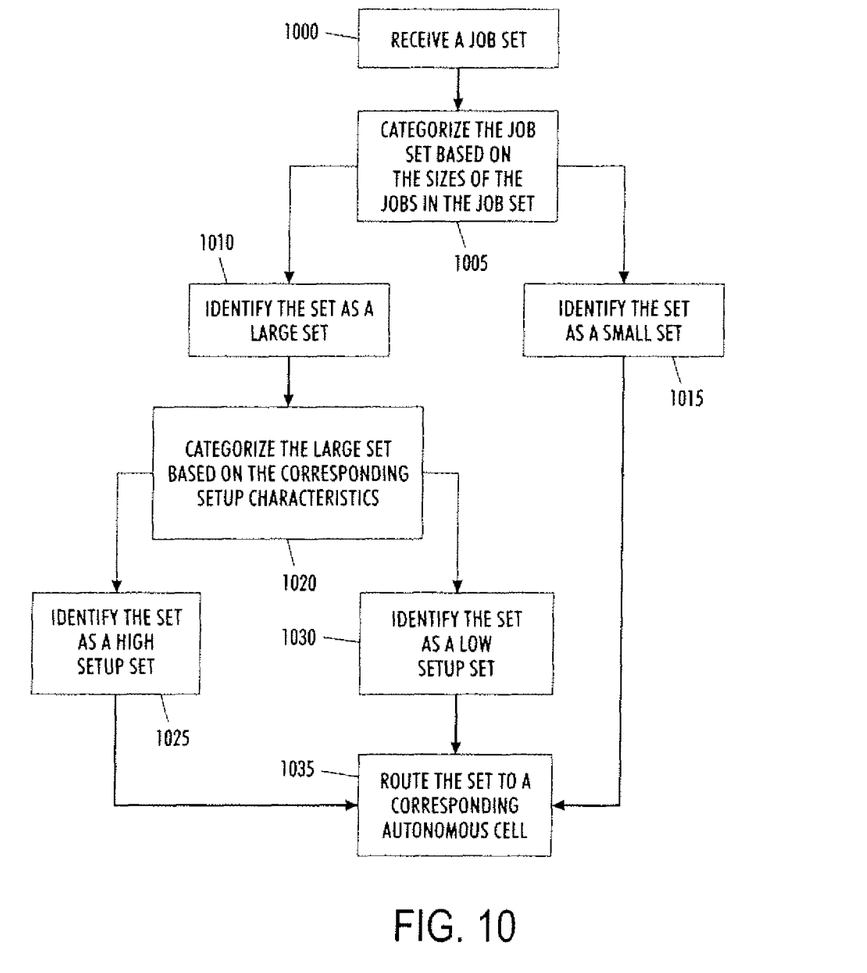
FIG. 10 depicts an exemplary flow chart of a partitioning process according to an embodiment.

FIG. 10 illustrates an exemplary flow chart of a grouping a plurality of jobs according to an embodiment. A plurality of jobs may be received 1000 and the jobs may be grouped 1005 based on job size. The jobs may either be identified as a large job subgroup 1010 or a small job subgroup 1015. A large job subgroup may be categorized 1020 based on setup characteristics as a high setup subgroup 1025 or a low setup subgroup 1030. The subgroups may be routed 1035 to one or more corresponding autonomous cells for processing.

Figure 11:
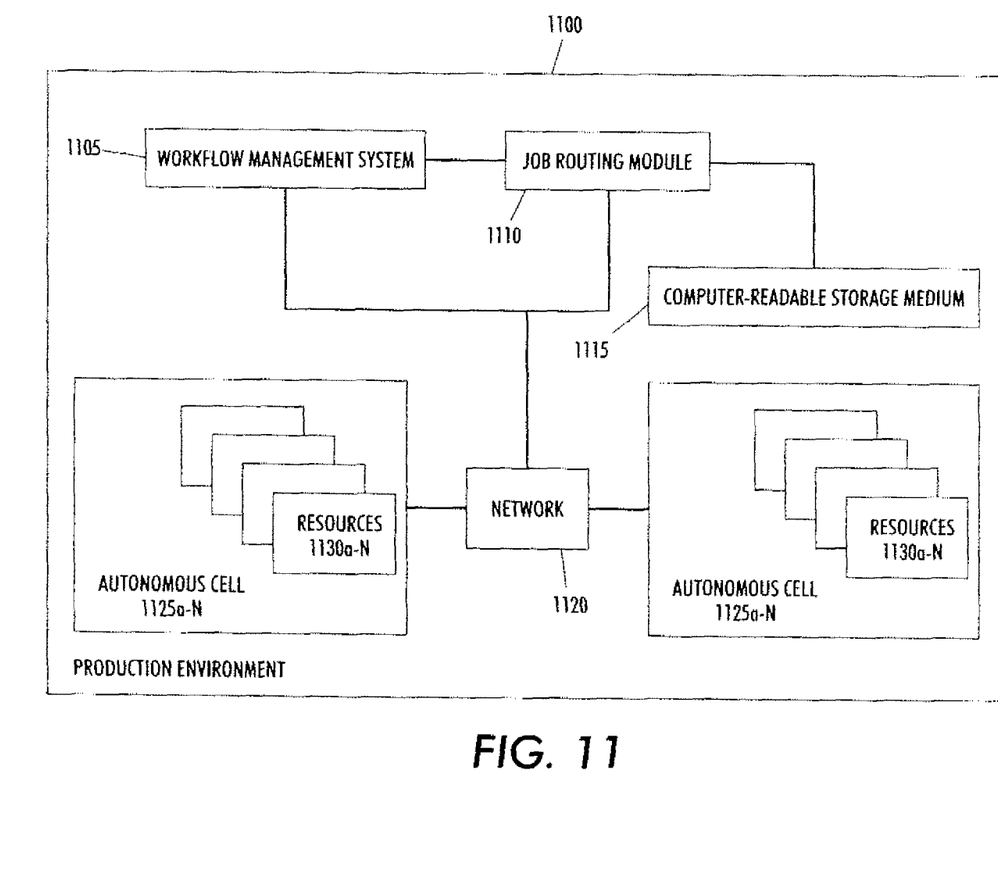
FIG. 11 depicts an exemplary environment suitable for processing a plurality of jobs according to an embodiment.

FIG. 11 depicts an environment suitable for practicing the illustrative embodiments. The production environment 1100 may include a workflow management system 1105 that is responsible for managing workflow in the production environment 1100, a job routing module 1110 that is responsible for routing jobs to resources and/or autonomous cells and a computer-readable storage medium 1115. The production environment 1100 may also include resources 1130a-N such as (in a document production environment) a printer, a copier, a binder, a hole-punch, a collator, a sealer or any other equipment used to process jobs. The resources may be grouped into autonomous cells 1125a-N such that each autonomous cell 1125a-N includes one or more resources 1130a-N necessary to process at least one job. The workflow management system 1105 may be implemented on a stand-alone computer system or may be integrated into the resources. The workflow management system 1105 may also be implemented by distributed components such as separate electronic devices. A network 1120 may interconnect the resources 1130a-N with the workflow management system 1105, as illustrated in FIG. 11. The network 1120 may include a local area network (LAN) or a wide area network (WAN) such as the Internet, the World Wide Web or the like. The network 1120 may also be formed by communication links that interconnect the workflow management system 1105 and the resources 1130a-N. Alternatively, the disclosed embodiments may be practiced in environments where there is no network connection.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A system of scheduling a plurality of jobs in a chemical production environment, the system comprising:
   a plurality of resources configured for chemical production;
   a computing device; and
   a non-transitory computer-readable storage medium in communication with the computing device, wherein the computer-readable storage medium comprises one or more programming instructions that, when executed, caused the computing device to:
      receive a plurality of jobs and at least one setup characteristic corresponding to each job, wherein each job has a corresponding job size, wherein the at least one setup characteristic is associated with preparing at least one of the plurality of chemical production resources for processing a chemical product,
      determine, for each job, whether the corresponding job size exceeds a job size threshold,
      group each job having a job size that exceeds the job size threshold into a large job subgroup,
      group each job having a job size that does not exceed the job size threshold into a small job subgroup,
      route the small job to a small job autonomous cell comprising one or more resources for processing the small job subgroup,
      classify the large job subgroup as a high setup subgroup or a low setup subgroup based on the setup characteristics corresponding to each job in the large job subgroup, by:
         identifying one or more setup characteristics associated with the large job subgroup, wherein each setup characteristic has one or more associated types,
         for each setup characteristic, determining the number of types associated with the large job subgroup,
         determining that the large job subgroup is a high setup subgroup if the number of associated types of at least one setup characteristic exceeds a threshold value associated with the setup characteristic, and
         determining that the large job subgroup is a low setup subgroup if, for each setup characteristic, the number of corresponding types does not exceed the threshold value associated with the setup characteristic, and
      route the large job subgroup to a large job autonomous cell wherein, if the large job subgroup is a high setup, the large job autonomous cell comprises one or more first resources for processing the large job subgroup and wherein, if the large job subgroup is a low setup subgroup, the large job autonomous cell comprises one or more second resources for processing the large job subgroup.

2. The system of claim 1, wherein the one or more programming instructions that, when executed, cause the computing device to each job having a job size that exceeds the job size threshold into a large job subgroup comprise one or more programming instructions that, when executed, cause the computing device to:
   arrange the jobs in the large job subgroup based on an order in which each job was received.

3. The system of claim 1, wherein the one or more programming instructions that, when executed, cause the computing device to each job having a job size that does not exceed the job size threshold into a small job subgroup comprise one or more programming instructions that, when executed, cause the computing device to:
   arrange the jobs in the small job subgroup based on an order in which each job was received.

4. The system of claim 1, wherein the one or more programming instructions that, when executed, cause the computing device to each job having a job size that exceeds the job size threshold into a large job subgroup comprise one or more programming instructions that, when executed, cause the computing device to:
   arrange the jobs in the large job subgroup based on a due date of each job.

5. The system of claim 1, wherein the one or more programming instructions that, when executed, cause the computing device to each job having a job size that does not exceed the job size threshold into a small job subgroup comprise one or more programming instructions that, when executed, cause the computing device to:
   arrange the jobs in the small job subgroup based on a due date of each job.

6. The system of claim 1, further comprising one or more programming instructions that, when executed, cause the computing device to:
   compare the number of associated types to an average number of types associated with the setup characteristic over a specified time period.

7. The system of claim 1 wherein one or more programming instructions that, when executed, cause the computing device to route the small subgroup comprises one or more programming instructions that, when executed, cause the computing device to:
   use a routing policy selected from a random policy, a round-robin policy, a least work-in-progress policy and a size interval task assignment with equal load policy.

8. The system of claim 1, wherein the one or more programming instructions that, when executed, cause the computing device to route the large job subgroup comprise one or more programming instructions that, when executed, cause the computing device to:
   determine a work-in-progress level for each large job autonomous cell wherein the work-in-progress level represents a level of work that is being processed in the large job autonomous cell at a specified time; and
   route the large subgroup to the large job autonomous cell with the smallest work-in-progress level.

9. The system of claim 1, wherein the one or more programming instructions that, when executed, cause the computing device to route the large job subgroup comprise one or more programming instructions that, when executed, cause the computing device to:
   use a round-robin policy to route the large job subgroup to a large job autonomous cell.

10. The system of claim 1, wherein the one or more programming instructions that, when executed, cause the computing device to route the large job subgroup comprise one or more programming instructions that, when executed, cause the computing device to:
    randomly route the large job subgroup to a large job autonomous cell.

11. The system of claim 1, wherein the one or more programming instructions that, when executed, cause the computing device to route the large job subgroup comprise one or more programming instructions that, when executed, cause the computing device to:
  determine a range of job sizes for the jobs in the large job subgroup; and
  route the large job subgroup to a large job autonomous cell, wherein the large job autonomous cell processes the determined range of job sizes.

12. A computer-implemented method of scheduling a plurality of jobs in a chemical production environment, the method comprising:
  receiving a plurality of jobs and at least one setup characteristic corresponding to each job, wherein each job has a corresponding job size, wherein the at least one setup characteristic is associated with preparing at least one of a plurality of chemical production resources for processing a chemical product;
  determining, for each job, whether the corresponding job size exceeds a job size threshold;
  grouping each job having a job size that exceeds the job size threshold into a large job subgroup;
  grouping each job having a job size that does not exceed the job size threshold into a small job subgroup;
  routing, by a computing device, the small job subgroup to a small job autonomous cell comprising one or more resources for processing the small subgroup;
  classifying, by the computing device, the large job subgroup as a high setup subgroup or a low setup subgroup based on the setup characteristics corresponding to each job in the large job subgroup by:
    identifying one or more setup characteristics associated with the large job subgroup, wherein each setup characteristic has one or more associated types, for each setup characteristic,
    determining the number of types associated with the large job subgroup,
    determining that the large job subgroup is a high setup subgroup if the number of associated types of at least one setup characteristic exceeds a threshold value associated with the setup characteristic, and
    determining that the large job subgroup is a low setup subgroup if, for each setup characteristic, the number of corresponding types does not exceed the threshold value associated with the setup characteristic; and
  routing the large job subgroup to a large job autonomous cell wherein, if the large job subgroup is a high setup subgroup, the large job autonomous cell comprises one or more first resources for processing the large job subgroup and wherein, if the large job subgroup is a low setup subgroup, the large job autonomous cell comprises one or more second resources for processing the large job subgroup.

13. The method of claim 12, wherein grouping each job having a job size that exceeds the job size threshold into a large job subgroup comprises:
  arranging the jobs in the large job subgroup based on an order in which each job was received.

14. The method of claim 12, wherein grouping each job having a job size that does not exceed the job size threshold into a small job subgroup comprises:
  arranging the jobs in the small subgroup based on an order in which each job was received.

15. The method of claim 12, wherein grouping each job having a job size that exceeds the job size threshold into a large job subgroup comprises arranging the jobs in the large job subgroup based on a due date of each job.

16. The method of claim 12, wherein grouping each job having a job size that does not exceed the job size threshold into a small job subgroup comprises:
  arranging the jobs in the small job subgroup based on a due date of each job.

17. The method of claim 12, further comprising:
  comparing the number of associated types to an average number of types associated with the setup characteristic over a specified time period.

18. The method of claim 12, wherein routing the small subgroup comprises:
  using a routing policy selected from a random policy, a round-robin policy, a least work-in-progress policy and a size interval task assignment with equal load policy.

19. The method of claim 12, wherein routing the large job subgroup comprises:
  determining a work-in-progress level for each large job autonomous cell, wherein the work-in-progress level represents a level of work that is being processed in the large job autonomous cell at a specified time; and
  routing the large subgroup to the large job autonomous cell with the smallest work-in-progress level.

20. The method of claim 12, wherein routing the large job subgroup comprises:
  using a round-robin policy to route the large job subgroup to a large job autonomous cell.

21. The method of claim 12, wherein routing the large job subgroup comprises:
  randomly routing the large job subgroup to a large job autonomous cell.

22. The method of claim 12, wherein routing the large job subgroup comprises;
  determining a range of job sizes for the jobs in the large job subgroup; and
  routing the large job subgroup to a large job autonomous cells wherein the large job autonomous cell processes the determined range of job sizes.

* * * * *